United States Patent [19]
Luthe

[11] 3,880,399
[45] Apr. 29, 1975

[54] MULTISTAGE NOISE REDUCING FLOW CONTROL VALVE

[75] Inventor: Fred Joseph Luthe, Marshalltown, Iowa

[73] Assignee: Fisher Controls Company, Inc., Marshalltown, Iowa

[22] Filed: Apr. 1, 1974

[21] Appl. No.: 456,691

[52] U.S. Cl. ............ 251/121; 251/127; 137/625.37
[51] Int. Cl. ............................................. F16k 47/04
[58] Field of Search .......................... 251/118–127; 137/625.28, .3, .34, .36, .37

[56] References Cited
UNITED STATES PATENTS
3,715,098 2/1973 Baumann ............................. 251/121

FOREIGN PATENTS OR APPLICATIONS
1,958,844 7/1970 Germany .............................. 25/127

*Primary Examiner*—Henry T. Klinksiek
*Attorney, Agent, or Firm*—James C. Bolding

[57] ABSTRACT

Described herein are fluid control valves suitable for use where high fluid pressure drops are to be sustained without excessive noise generation or damage to valve members. A valve is provided with a series of annular, axially spaced-apart chambers surrounding a central passageway. A valve stem carrying a series of valve plug members is axially movable within the central passageway, one such plug member traversing the radially inward surface of each of the annular chambers. Communicating between the central passageway and each of the chambers are substantially nonrestricting flow passageways and each of the chambers are substantially nonrestricting flow passageways offering little resistance to fluid flow near the end of each chamber closest to the valve inlet, and flow restricting orifices near the end of each chamber closest to the valve outlet. A fluid flow path between annular chambers is thus defined from a chamber into the central passageway through orifices exposed for fluid flow on the downstream sides of the valve plugs, thence into the next succeeding annular chamber through the nonrestricting passageways thereby providing a series of orificial throttling stages, each stage having a valve plug by which the flow area of each stage may be varied, and the pressure differential across each stage may be maintained in a predetermined relationship to that across other stages.

12 Claims, 3 Drawing Figures

MULTISTAGE NOISE REDUCING FLOW CONTROL VALVE

FIELD OF THE INVENTION

This invention relates generally to fluid flow control valves of the type which are continuously adjustable from a closed to an open position to provide a quantity of fluid flow which is a function of valve position. More particularly, this invention relates to flow control valve trim for use in a fluid system in which high pressure drops must be achieved across a valve without concomitant cavitation, noise generation and physical damage to valve part.

BACKGROUND OF THE INVENTION

In fluid flow control systems it is frequently required to reduce fluid pressures by several hundreds of pounds per square inch in order to maintain flow control. Pressure drops of this magnitude are commonly accompanied by cavitation and generation of audible noise. Generally, cavitation will occur in a liquid system when the pressure is reduced below the vapor pressure of the liquid, at which time vapor bubbles form in the liquid. When, as in the case of a control valve, throttling is followed by pressure recovery, these vapor bubbles collapse or implode, generating shock waves in the liquid. These shock waves commonly result in severe erosion, or "cavitation damage," to valve parts when conventional plug and orifice valves are employed. Such damage, of course, leads to premature valve failure, having serious economic consequence.

DESCRIPTION OF THE PRIOR ART

Heretofore it has been common to treat the problems of cavitation, noise generation and metal erosion in fluid flow control valves in several ways. The first method of treatment, exemplified by the teachings of U.S. Pat. No. 3,637,188 to Ung, and U.S. Pat. No. 2,187,811 to Smith, has been to divide the throttling action of a control valve into a number of throttling stages of conventional plug and orifice design, each of the stages providing a fractional amount of the pressure drop required. This approach fundamentally consists of placing a number of conventional plug and orifice valves within a single valve body, and each stage of such a valve is subject to erosion and cavitation damage to the valve plugs and seats.

The second common treatment of the above described problems has been to incorporate a lengthy fluid flow path of tortuous or labyrinthine configuration within the internal elements of a valve. Typical of such valves are those taught by U.S. Pat. Nos. 3,715,098 and 3,485,474 to Baumann. Such valves are commonly characterized as producing "adiabatic flow with friction," or pressure reduction accompanied by constant fluid enthalpy, which renders these valves less susceptible to cavitation damage and results in quieter valve operation. Manufacture of such valves having tortuous flow paths ordinarily requires costly, complex machining operations on the valve elements. Moreover, the fluid flowing through such a valve must flow past the edges of valve disk elements which are thus subject to erosion and cavitation damage.

A third treatment of these problems has been to provide within a valve body a cage member having perforated or slotted walls and a valve plug member slidable therein. In a valve of this type, exemplified by Allowed U.S. application Ser. No. 157,906, filed June 29, 1971 now U.S. Pat. No. 3,776,278, by E. E. Allen, the flowing fluid is subdivided into many smaller streams or jets flowing through the holes in the valve cage member. While these valves, as well as the prior art valves mentioned above are capable of significant noise reduction, nevertheless a further reduction in noise generation is often desirable and frequently required.

A fourth treatment of these problems which has more recently been applied has been to use a valve cage trim made up of a stack of annular plates or discs and having a valve plug member slidable therein. Etched or machined on these plates is a set of grooves forming tortuous passageways, orifice and baffle arrangements, or the like. Manufacture of this type of valve trim is necessarily relatively expensive in comparison with the above described valves. Moreover, retention of the discs in proper alignment may present a problem, and in operation these valves may be more susceptible to plugging by particulate matter entrained in the flowing fluid than the valve types described above.

BRIEF SUMMARY OF THE INVENTION

The general purpose of this invention is to provide a fluid flow control valve which functions quietly while sustaining high pressure differentials, yet is of simple construction.

An object of the present invention is to provide a structural configuration which achieves fluid pressure reduction and flow control by subjecting the flowing fluid to multiple stages of orificial throttling.

Another object of the present invention is to provide a valve structure in which the flow area of each stage of orificial throttling may be varied simultaneously to provide a predetermined relationship between the pressure drops in successive stages.

Still another object of this invention is to provide a structural configuration wherein a plurality of successive stages of flow throttling may be achieved within a reasonably compact valve body.

Yet another object of the present invention is to provide a structure which allows the fluid to expend energy upon itself rather than upon the component parts of the valve structure, by directing the fluid jets in such a way as to force them to impinge upon other similar fluid jets in the final orificial throttling stage.

A still further object of this invention is to provide a method of pressure reduction and flow control of a fluid without excessive concomitant cavitation and noise generation comprising the steps of subdividing and orificially throttling the fluid in successive orificial stages, the pressure drop in each stage bearing a predetermined relationship to that in other stages.

In the present invention, these purposes, as well as others which will be apparent, are achieved generally by a valve having a central generally cylindrical cage in which is slidably received a plurality of axially spaced valve plug elements carried on a reciprocable valve stem. Outside of this cage is a plurality of axially spaced annular chambers bounded by the outer surface of the cage and the inner surface of a generally cylindrical element in which the cage is received, the number of these chambers being equal to the number of valve plug elements. The axial spacing of the plug elements and the chambers is such that each plug element is associated with one chamber. A valve inlet passageway is provided through which fluid enters the chamber located at one end of the valve, while a valve outlet passageway connects with the interior of the valve cage at the axially opposite end of the valve. When the valve is in an open or partially open position, fluid flows from the interior of the valve cage into the chambers through a set of substantially non-flow-restricting passageways in the cage wall near the end of each chamber closest to the valve inlet, and from the chambers into the cage interior through flow restricting orifices in the cage wall near the axial end of each chamber nearest the valve outlet. The flowing fluid is thus seen to traverse the following path: from the valve inlet to an annular inlet chamber, thence to the cage interior through flow restricting orifices on the outlet side of the first valve plug, then axially toward the valve outlet, then radially outward through the non-restricting passageways into the second annular chamber, then axially within that chamber until it reaches an axial position on the valve outlet side of the second plug, and so forth through successive chambers. A valve constructed according to this invention may, of course, comprise as many of such stages as may be required considering the pressure differential desired to exist across the valve in operation. Flow regulation is achieved by axial adjustment of the valve plugs to expose more or fewer of the orifices in each stage communicating from each chamber to the interior of the valve cage, this adjustment being accomplished by movement of the valve stem by any of the several well-known valve positioning means. In this manner, the total orifice area and pressure drop of each stage may be maintained in a predetermined relationship to those in other stages.

BRIEF DESCRIPTION OF THE DRAWINGS

Attention is now directed to the annexed drawings, wherein like numbers denote like or corresponding elements, and in which.

DESCRIPTION OF A PREFERRED EMBODIMENT

Figure 1:
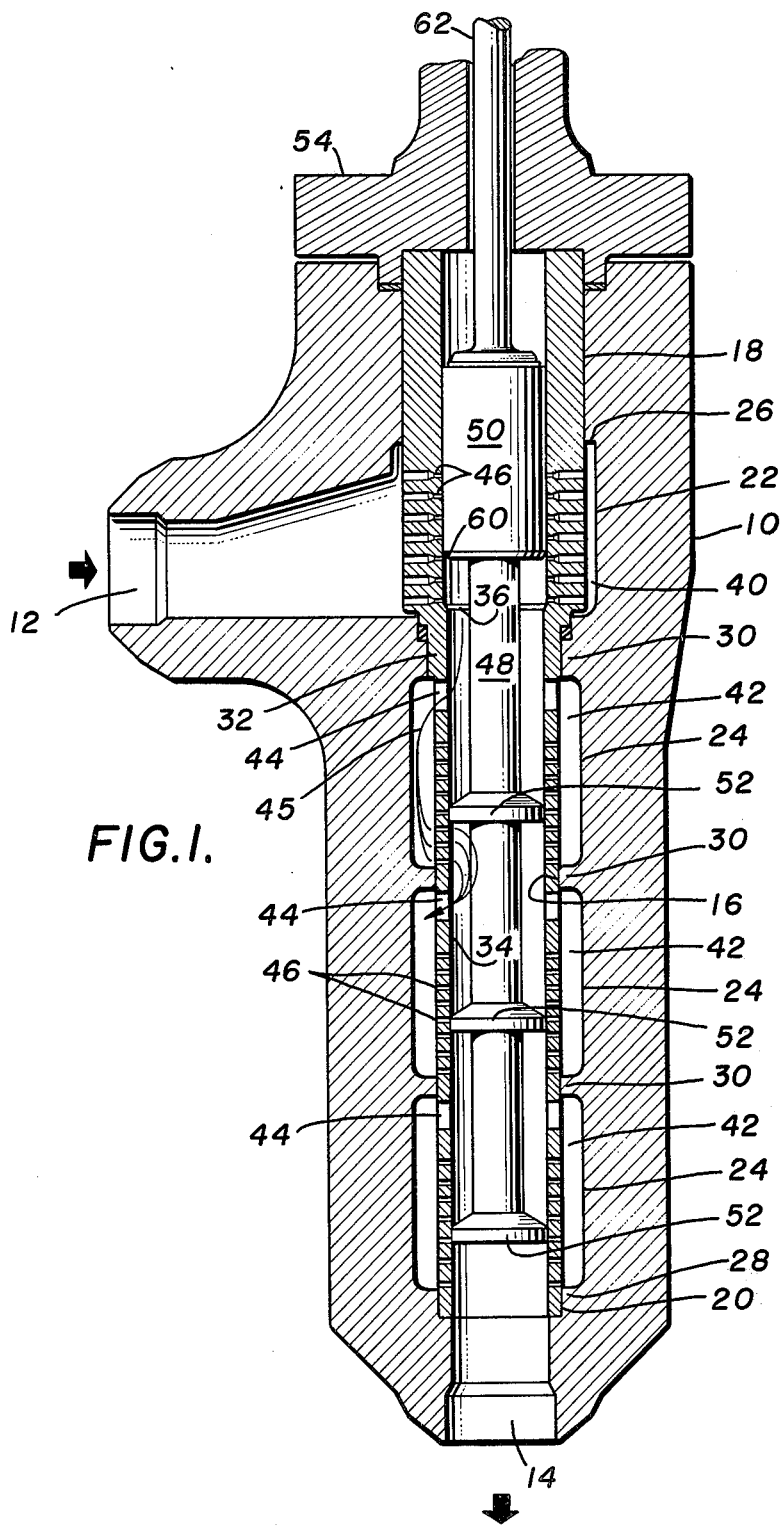
FIG. 1 is a vertical cross-sectional view of an embodiment of the present invention having four stages of orificial throttling, shown in a partially open position.

In the embodiment of my invention shown in FIG. 1 a valve body, generally designated 10, is provided with an inlet 12 and an outlet 14, each here shown adapted for butt-weld connections to upstream and downstream piping. The valve body 10 is provided with a passageway 16 having an inlet end 18, an outlet end 20. In and coaxial with the passageway 16 and contiguous to the inlet 12 there is provided a radially enlarged inlet portion 22, and intermediate the inlet and outlet passageways are located one or more similar radially enlarged chamber portions 24. There are thus formed between and at either end of these radially enlarged portions a series of spaced-apart annular flanges, the flange at the inlet end being designated 26, at the outlet end 28, and the flanges intermediate each pair of enlarged chamber portions 22 and 24 being designated generally as 30.

Received within the passageway 16 is a cage member 32 having its outer surface in sealing engagement with the inward surfaces of the flanges 26, 28, and 30. It will be seen that there are thus formed a plurality of, herein four, axially spaced-apart annular chambers, including an inlet chamber 40 and chambers 42 intermediate the valve inlet and outlet, between the outside surface of the cage member 32 and the radially enlarged portions 22 and 24. The cage member 32 is further provided with a generally cylindrical inner bore 34 and may be provided, as here shown, with a valve seat 36.

The cage member 32 may be conveniently retained within the passageway 16 at its outlet end 20 by means of an outlet flange member 28, and at its inlet end 18 by a conventional valve bonnet 54 adapted to be secured to the valve body 10 by bolting or other conventional means (not shown).

Disposed in the wall of the cage member 32 and communicating from the interior thereof to the portions of each of the annular chambers 42 nearest the valve inlet 12 are a plurality of passageways 44. The passageways 44 are preferably dimensioned such that very little pressure drop is sustained across them when the valve is in operation. Disposed in the wall of the cage member 32 and communicating between the portions of each of the chambers 40 and 42 nearest the valve outlet 14 and the interior of cage member 32 are a plurality of fluid restricting orifices 46. The size and number of these orifices 46 communicating from each of the chambers 40 and 42 may be determined by reference to any of the well-known orifice equations, bearing in mind the following criteria: first, that the orifices 46 should be sufficiently large that they will not readily be plugged or occluded by solid particles carried by the flowing fluid; second, that it may be desirable when throttling some fluids, to provide a progressively greater flow path area nearer the valve outlet to allow for expansion of such a fluid; and third, that the desired pressure drops from the valve inlet 12 to the valve outlet 14 is to be the sum of the pressure drops sustained by fluid flowing serially from each of the chambers 40 and 42 into the interior of valve cage member 32. Other secondary orifice-sizing criteria will be apparent to those skilled in the art from a consideration of the particular fluid flow problem desired to be solved.

Disposed within the interior of the cage member 32 and coaxial therewith is a valve stem 48, one end of which (herein the end 62 nearest the valve inlet 12) extends through an appropriate opening in the bonnet 54 and is axially reciprocable by any of the several well-known valve actuating means. Retained within an annular recess in the bonnet 54 surrounding the stem 48 may be any suitable stem sealing assembly (not shown) which prevents the escape of fluid from within the valve into the surrounding atmosphere. One such suitable sealing assembly comprises the well-known seal material, packing follower, and packing nut arrangement.

Carried by the valve stem 48 and spaced-apart thereon are an inlet valve plug member 50 and one or more (herein three) plug members 52. As is shown here, if the valve is provided with a valve seat 36, one valve plug member, herein the inlet member 50, may be provided with a sealing surface 60 for sealing by engaging the seat 36. Each of plug members 50 and 52 is associated with a corresponding chamber 40 or 42 in the following manner: by reciprocation of the valve stem 48, the inlet valve plug member 50 is reciprocable generally within length of inlet chamber 40, and one of the plug members 52 is similarly reciprocable within the length of each of the chambers 42. The outward surfaces of the plug members 50 and 52 are of such a radial dimension as to place them in sliding engagement with the interior bore 34 of the valve cage member 32 and to substantially prevent leakage of a fluid between the plug and the cage. The axial position of the plug members 50 and 52 is such as to place at least a portion of the outward surface of each of said plug members at a position nearer the valve outlet 14 than any of the orifices 46 communicating between the interior of the cage member 32 and the chamber with which that plug member is associated, when the valve is closed the plug members 50 and 52 prevent the passage of fluid from the inlet 12 to the outlet 14 through the interior of the cage member 32 and likewise through the orifices 46 from the chambers 40 and 42. When the valve stem 48 is moved axially to a "valve open" position, the plug members 50 and 52 will be moved thereby to expose some or all of the orifices 46 on the side of each of plug members 50 and 52 nearest the valve outlet 14, whereby a fluid flow path, designated generally as 45, is formed from the inlet 12 to the outlet 14 in the following manner: fluid is permitted to flow from valve inlet 12 into the inlet chamber 40, thence into the interior of the cage member 32, through those of orifices 46 which are exposed by axial movement of plug member 50, then within the cage member 32 toward the valve outlet 14, then outward through the passageways 44, thence axially within the first of the intermediate chambers 42, thence inward through the orifices 46 exposed for communication between said first intermediate chamber and the interior of the cage member 32 on the outlet side of the first plug member 52, and so on in a like manner through the remainder of the chambers 42 until it reaches the valve outlet 14. It is to be understood, of course, that a portion of the fluid flowing from the interior of the cage member 32 into the chambers 42 may flow through those of the orifices 46 which may be located on the valve inlet side of the valve plugs 52. The majority of the fluid, however, will flow through the passageways 44, because these passageways are relatively non-restrictive of flow in comparison with the orifices 46.

It will be apparent that in this process of multistage throttling of a fluid in the manner thus described, the throttling occurs upon the passage of the fluid out of the chambers 40 and 42 into the interior of the cage member 32 through the orifices 46, at which time the fluid is directed radially inward. I have found that the direction of fluid flow radially inward is particularly advantageous in that jets from diametrically opposed orifices in the last stage tend to expend energy on each other rather than on the valve body or outlet piping as is the case with conventional valves.

It is a further advantage of valves constructed in accordance with this invention that as the radially outward portions of the plug members 50 and 52 and the inner surface 34 of the cage member 32 wear through prolonged use, any fluid which may leak from the valve inlet 12 to outlet 14 by passing along the inner surface 34 of the cage member 32 will be subjected to a series of throttling processes, one such process occurring at the point of each leak between one of the valve plug members 50 or 52 and the inner surface 34.

Figure 2:
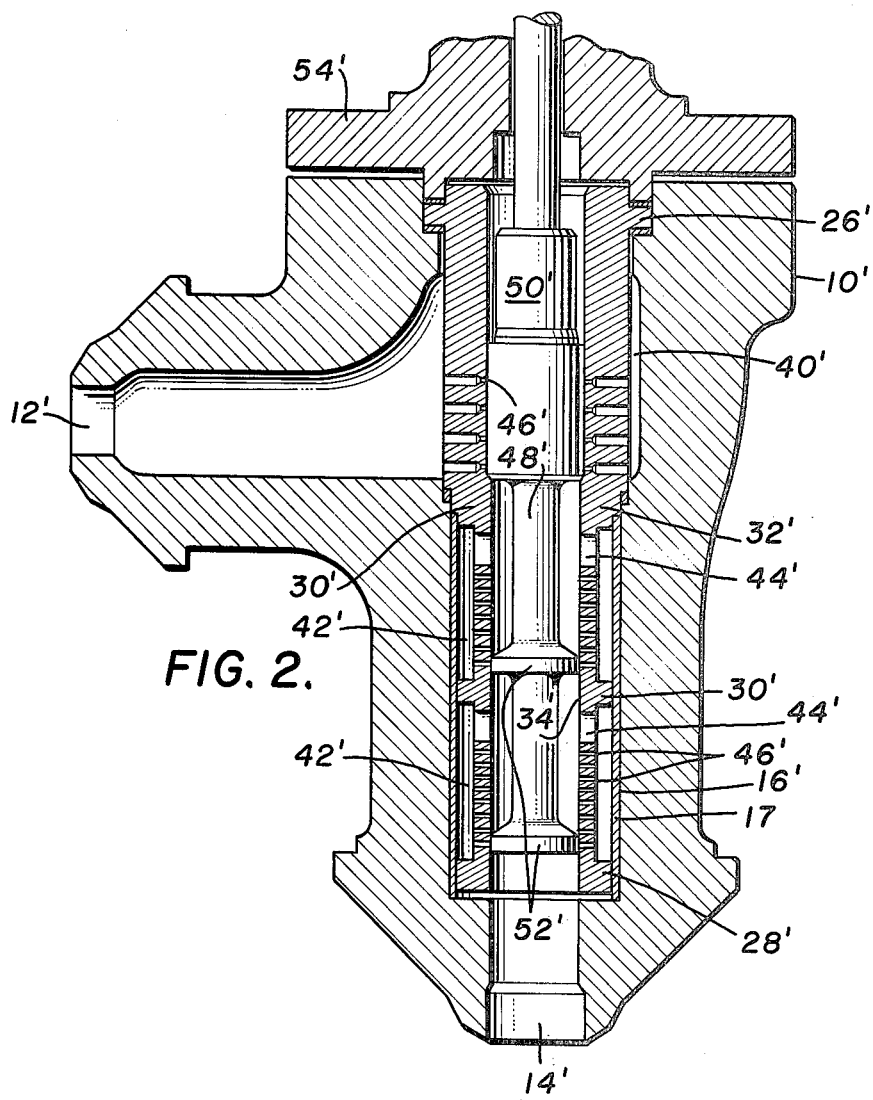
FIG. 2 is a vertical cross-sectional view of a second embodiment of the present invention, having three stages of orificial throttling, and shown in a closed position.

Turning now to FIG. 2, there is shown an alternative embodiment of the present invention, in which a valve body 10' has an inlet 12', an outlet 14', and a generally cylindrical inner passageway 16' which may be optionally provided with an inner cylindrical liner 17. This liner 17 may, of course, be omitted if desired. Received within the inner liner 17 is a valve cage member 32' having a generally cylindrical inner bore 34' and having formed on its outer surface a plurality of flange members 26', 28', and 30', members 28' and 30' sealingly engaging the inner surface of the liner 17 and defining therewith a plurality of, herein three, axially spaced-apart annular chambers including an inlet chamber 40' and two further chambers 42'. As in the embodiment shown in FIG. 1, the wall of the cage member 32' is provided with a plurality of fluid flow passageways 44' near the inlet ends of the chambers 42', and is further provided with a set of flow restricting orifices 46' near the outlet ends of the chambers 40' and 42'.

Disposed within the interior of the cage member 32' and coaxial therewith is a valve stem 48' on which are spaced-apart an inlet valve plug member 50' and one or more (herein two) plug members 52'. These plug members 50' and 52' slidingly engage in inner surface of the cage member 32', and by reciprocation of the valve stem 48' each plug member may be made to traverse one portion of the inner surface of the cage member 32' in which is located a set of orifices 46'. It will be apparent that the fluid flow path and method of operation of this embodiment are the same as those of the embodiment of FIG. 1.

Figure 3:
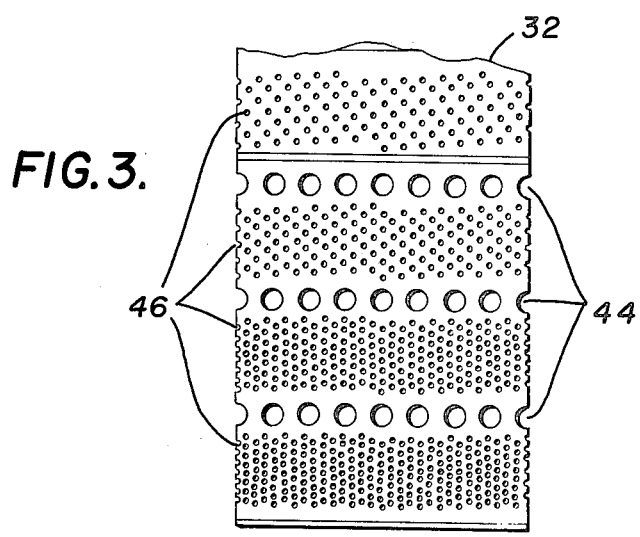
FIG. 3 is a developed view of the external surface of a cage member employed in the present invention, showing a preferred arrangement of the flow-restricting orifices of a valve having four pressure reduction stages.

Turning now to FIG. 3, there is shown a preferred arrangement of the orifices 46 and the passageways 44 on the outer surface 36 of cage member 32 of FIG. 1, wherein the set of orifices 46 associated with each of the chambers 40 and 42 is arranged in a double lead spiral around the periphery of the cage member 32. This orifice arrangement is particularly advantageous in that the fluid flow area, that is, the cumulative area of the orifices 46 exposed for fluid flow in each stage, may be varied gradually and continuously by a change in axial position of the plug members 50 and 52. Moreover, by the use of a double lead spiral pattern for the orifices 46, these orifices may be arranged so that two orifices are diametrically opposed, an arrangement which results in balancing of radial forces on the valve stem 48.

Preferably, the size and number of the orifices 46 in each throttling stage are selected according to the well-known orifice equations, such that the pressure differentials occurring across each stage bear a predetermined relationship to those in other stages. More particularly, I have observed that the parameter $\Delta P/(P_u - VP)$ should not be allowed to exceed about 0.8, where $\Delta P$ is the pressure drop occurring across a throttling stage, $P_u$ is the upstream pressure for that stage, and $VP$ is the vapor pressure of the fluid being throttled. It will be clear in calculating the parameter $\Delta P/(P_u - VP)$ for each stage that the pressure downstream of the first stage of throttling (that is, $P_u - \Delta P$ for the first stage) becomes the upstream pressure $P_u$ for the second stage, and so forth for successive stages. When the value of this parameter is maintained below about 0.8, I have found that erosion and cavitation damage to valve parts, as well as noise generation, are reduced markedly, while an excessive number of throttling stages may be required if this parameter is maintained below about 0.5. I have found that in practicing my invention, therefore, the value of $\Delta P/(Pu - VP)$ is preferably maintained at about 0.6 which represents an advantageous compromise between the considerations just described. An exception exists to the foregoing general statement, however, in the final throttling stage of the instant invention. Because the valve stem 48 does not extend beyond the valve plug member 52 of the final stage, the jets of fluid exiting from the orifices 46 in that stage do not impinge upon the valve stem, but rather upon other jets of fluid from opposed orifices. The fluid leaving the final throttling stage therefore tends to expend energy upon itself rather than on valve parts, and for this reason it may be possible in many applications of my invention to take a greater pressure drop across the final stage than would be calculated using the criterion that $\Delta P/(Pu - VP)$ be less than about 0.8. By way of example and not of limitation, I have observed that in controlling the flow of water from a municipal water supply with a value according to this invention it is possible to sustain a pressure differential of about 400 pounds per square inch across the final pressure reduction stage without excessive noise generation or damage to valve parts.

Having thus described the preferred embodiments of this invention, it will be apparent that many modifications and variations are possible in the light of the above teachings. By way of example of such modifications, and not of limitation, in a valve constructed according to the present invention, the orifices 46 need not necessarily be round holes, but may instead be slots or any other suitable configuration. It is therefore to be understood that my invention may be practiced other than as herein specifically described.

I claim:

1. A high-pressure flow control valve, comprising:

a valve body having an inlet, an outlet, and a central passageway communicating therebetween;

valve cage means received within and cooperating with said passageway to define a central bore, an enlarged inlet chamber communicating with said inlet, and at least one further chamber spaced apart from said inlet chamber, each of said chambers surrounding said bore;

said valve cage means including a plurality of pressure-reducing orifices registering with said inlet and further chambers near the outlet ends thereof to form inlet and further throttling stages, and a plurality of substantially nonrestricting flow passages registering with said further chamber near the inlet end thereof;

vale stem means reciprocably received within said central bore; and valve plug means carried by said stem means and slidingly engaging said central bore for selectively exposing a variable number of said restricting orifices registering with each of said chambers for fluid flow.

2. A valve as defined in claim 1, wherein said valve cage means includes radially enlarged partitioning means in sealing engagement with said passageway for separating said chambers.

3. A valve as defined in claim 1, wherein said valve body includes radially inwardly-extending partitioning means in sealing engagement with said valve cage means for separating said chambers.

4. A valve as defined in claim 1, wherein said central bore of said cage means comprises a pair of generally cylindrical coaxial surfaces having different diameters and a valve seating surface between said cylindrical surfaces, and one of said valve plug means is provided with a valve sealing surface for sealingly engaging said seating surface when said valve is in a closed position.

5. A valve as defined in claim 1, wherein said orifices of said inlet and further throttling stages are arranged in a double lead spiral pattern in said valve cage means.

6. A valve as defined in claim 5, wherein each orifice of one spiral is diametrically opposed by an orifice of the second spiral of said double lead spiral pattern.

7. A valve as defined in claim 1, wherein the total area of said orifices of said further throttling stage which are exposed for fluid flow by said valve plug means is greater than the total area of said orifices of said inlet throttling stage which are exposed for fluid flow by said valve plug means.

8. A valve as defined in claim 7, wherein said orifices of said inlet and further throttling stages are of the same size, and the number of said orifices of said further stage is greater than the number of said orifices of said inlet stage.

9. A valve as defined in claim 7, wherein said total orifice areas exposed for fluid flow in said first and said further stages are in a predetermined relationship irrespective of the axial position of said valve stem means to maintain the fluid pressure differentials occurring across said stages in a predetermined relationship.

10. A valve as defined in claim 9, wherein said pressure differentials each of said stages except the last throttling stage are maintained between 0.5 and 0.8 times the difference between the pressure upstream of that respective stage and the vapor pressure of the fluid.

11. A method of high pressure drop fluid flow control, comprising the steps of:

subdividing and throttling a fluid through a plurality of serially arranged multiorificial throttling stages, and varying the areas open for fluid flow in each of said stages to maintain between said areas a predetermined relationship.

12. The method as defined in claim 11, comprising the further steps of:

maintaining said areas such that in each of said stages except the final stage the pressure differential is from 0.5 to 0.8 times the difference between the pressure upstream of that stage and the vapor pressure of said fluid, and directing the fluid leaving said final stage such that said fluid expends energy upon itself to further reduced said pressure.

* * * * *